(12) United States Patent
Usami

(10) Patent No.: US 6,507,550 B1
(45) Date of Patent: Jan. 14, 2003

(54) OPTICAL DATA STORAGE MEDIUM

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/359,904

(22) Filed: Jul. 26, 1999

(30) Foreign Application Priority Data

Aug. 10, 1998 (JP) ........................................... 10-226199
Aug. 10, 1998 (JP) ........................................... 10-226214

(51) Int. Cl.$^7$ ................................................ G11B 7/00
(52) U.S. Cl. ...................................................... 369/113
(58) Field of Search ................................ 369/113, 108, 369/275.4, 283, 286, 288

(56) References Cited

U.S. PATENT DOCUMENTS

| | | | |
|---|---|---|---|
| 5,703,868 A | * 12/1997 | Kobayashi et al. | 369/286 |
| 5,820,961 A | * 10/1998 | Maruyama et al. | 369/283 |
| 6,165,578 A | * 12/2000 | Ohno et al. | 369/288 |

FOREIGN PATENT DOCUMENTS

| | | |
|---|---|---|
| EP | 0762407 A2 | 3/1997 |
| JP | 08-306078 A | 11/1996 |
| JP | 09-274735 A | 10/1997 |
| JP | 10-031845 A | 2/1998 |

* cited by examiner

Primary Examiner—Allen Cao
(74) Attorney, Agent, or Firm—Sughrue Mion, PLLC

(57) ABSTRACT

The present invention provides an optical data storage medium prepared by laminating face-to-face two substrates, at least one of which has a recording layer provided thereon, such that the recording layer faces inwardly, wherein the color difference between the two substrates is 10 or more. Alternatively, the present invention provides an optical data storage medium prepared by laminating face-to-face two substrates, at least one of which has a recording layer provided thereon, such that the recording layer faces inwardly, wherein optically recognizable different patterns are provided on the two substrates. Since the colors or the patterns on the two substrates are different, the two substrates are easily distinguishable from each other. Further, the present invention provides a single-side type optical data storage medium prepared by laminating face-to-face a disk comprising a first substrate having thereon a recording layer containing a coloring agent and a disk comprising a second substrate, wherein the ratio between the optical absorption of the first substrate at the wavelength of maximum absorption in a visible light region and the optical absorption of the second substrate at the wavelength of maximum absorption in the visible light region is set such that the smaller optical absorption is 50% or more of the larger optical absorption. Since the colors on the two substrates are the same, disadvantages such as warping of the substrates are minimized.

16 Claims, 1 Drawing Sheet

OPTICAL DATA STORAGE MEDIUM

BACKGROUND OF THE INVENTION

1. Field of the Invention

The present invention relates to an optical data storage medium comprising two disks laminated to each other.

2. Description of the Related Art

In recent years, DVD-Rs (additionally recordable digital video disk or additionally recordable digital versatile disk) comprising two disks laminated to each other have been developed as an optical data storage medium capable of storing a large amount of data. Among the types of DVD-Rs, there are a single-side type having a recording layer on only one side and a double-side type having recording layers on both sides. Presently, the single-side type constitutes a main stream.

In the case of the single-side type DVD-R, constituent disks may vary; for example, one disk may be provided with a reflective layer or a recording layer, while another disk may lack such a layer. Moreover, these disks may each have a reflective layer according to a different specification. On the other hand, in the case of the double-side type DVD-R, specifications of the disks are often different. For example, a print is made on the inner peripheral portion of one disk, while no such print is made on another disk. As a result, the above-mentioned difference often causes troubles. For example, already recorded disks are laminated to each other, or alternatively unrecorded disks are laminated to each other.

As a conventional practice in the case of the single-side type DVD-R, sometimes a substrate on a read-out side is colored in order to isolate the recording layer from light having wavelengths other than a data reproducing wavelength so that the storage stability of an optical date storage medium is enhanced. The effect of coloring the substrate is particularly remarkable if the recording layer contains a coloring agent.

As for the coloring of the substrate, there are two methods. A first method comprises blending a prescribed amount of a master batch, which is prepared in advance by blending a dye or a pigment at a high concentration into pellets, into noncolored pellets. A second method comprises directly blending a coloring agent, such as a dye, a pigment, or the like, into a resin. A substrate having a desired color and a desired concentration of the coloring agent can be obtained by any of these methods if the proportions of the materials are properly controlled.

The blending of a master batch or a coloring agent into noncolored pellets or a resin, however, brings about a change in, for example, coefficient of moisture absorption to an extent that mechanical properties, such as warping, plane deflection, and others, are degraded. In the case of DVD-R, it has been found that the degradation becomes more significant as the color difference between the two substrates becomes greater.

SUMMARY OF THE INVENTION

In view of the above-mentioned facts associated with the prior art, the present invention was made. A first object of the present invention is to provide an optical data storage medium comprised of disks for lamination and having an easily distinguishable front and back.

A second object of the present invention is to provide a single-side type DVD-R having excellent mechanical properties.

The present invention provides an optical data storage medium prepared by laminating face-to-face two substrates, at least one of which has a recording layer provided thereon, such that the recording layer faces inwardly, wherein the color difference between the two substrates is 10 or more.

Further, the present invention provides an optical data storage medium prepared by laminating face-to-face two substrates, at least one of which has a recording layer provided thereon, such that the recording layer faces inwardly, wherein optically recognizable different patterns are provided on the two substrates.

As described above, if at least one of difference in color and difference in pattern is present between the two substrates, the front and the back of a disk can be easily recognized during manufacturing processes. Further, it is possible to provide a new design in order to add beauty to the disk or to allow the users to easily recognize the type of the media by color. Furthermore, it is also possible to reduce detection errors of a sensor in detecting the presence or absence of the substrate. If the color difference $\Delta E$ between the substrates is 10 or more, the front and the back of a disk can be easily recognized by a simple color sensor. Accordingly, the present invention is effective particularly in the case of a double-side type DVD in which both of the substrates are often colored and which has a recording layer containing a coloring agent.

Furthermore, the present invention provides a single-side type optical data storage medium prepared by laminating face-to-face a disk comprising a first substrate having thereon a recording layer containing a coloring agent and a disk comprising a second substrate, wherein the ratio between the optical absorption of the first substrate at the wavelength of maximum absorption in a visible light region and the optical absorption of the second substrate at the wavelength of maximum absorption in the visible light region is set such that the smaller optical absorption is 50% or more of the larger optical absorption.

Furthermore, the present invention provides a single-side type optical data storage medium prepared by laminating face-to-face a disk comprising a first substrate having thereon a recording layer containing a coloring agent and a disk comprising a second substrate, wherein the ratio between the average optical absorption of the first substrate at wavelengths ranging from 400 to 700 nm and the average optical absorption of the second substrate at wavelengths ranging from 400 to 700 nm, is set such that the smaller average optical absorption is 50% or more of the larger average optical absorption.

The fact that the values of optical absorption of the two substrates are close to each other means that the colors or the contained percentages of the coloring agents contained in the respective substrates are close to each other. If the colors or the contained percentages of the coloring agents contained in the respective substrates become closer to each other, the difference in the amounts of moisture absorption or in mechanical properties due to the difference in colors or the difference in the contained percentages of the coloring agents becomes smaller. As a result, the mechanical properties, such as warping, plane deflection, and others, after lamination are prevented from degradation.

Further, when an ultraviolet light-curable adhesive is used for laminating the two disks, a high-power lamp such as a metal halide lamp or a xenon lamp is used for the curing of the adhesive. Since the light emitted from these lamps includes not only ultraviolet rays but also rays in a visible light region, the light in the visible light region is absorbed into the substrate and, as a result, the temperature of the substrate is raised if the substrate irradiated with the light is a colored substrate. However, since the first substrate and the second substrate have the same color in the present invention, the amounts of the light absorption of the two substrates are the same. Therefore, degradation of the mechanical properties after the lamination is not aggravated.

DETAILED DESCRIPTION OF THE PREFERRED EMBODIMENTS

Figure 1:
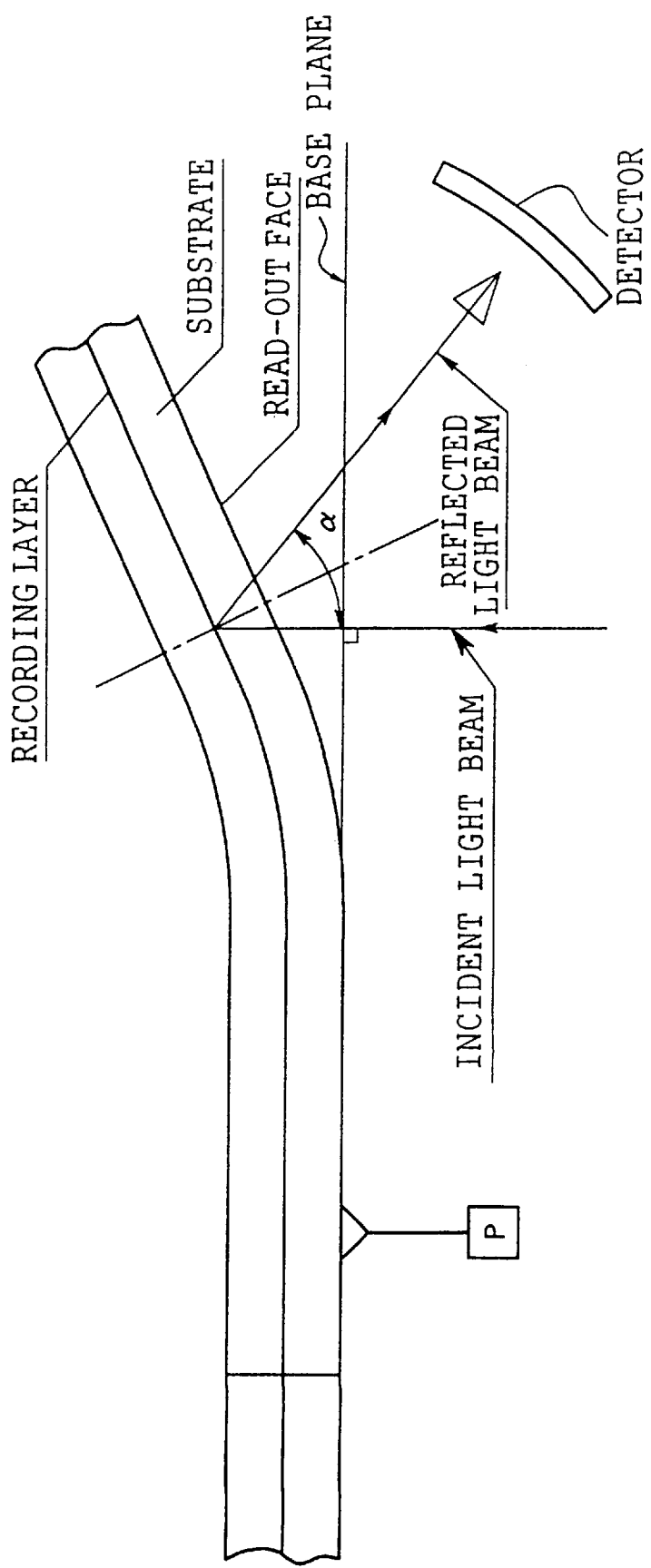
FIG. 1 is a schematic diagram illustrating the method for measuring a tilt.

The optical data storage medium of the present invention may be for reading only, or may be for recording. The optical data storage medium is prepared by laminating two disks. At least one of the disks has on a discoid substrate a recording layer capable of recording information by the irradiation with a laser light. The other disk may be a dummy disk which comprises a substrate alone or which comprises a substrate and a metal layer or another layer provided thereon. The following description is given by taking DVD-Rs as an example. However, is must be noted that the present invention is applied to optical data storage media such as the DVDs or the like prepared by laminating two substrates face-to-face such that the recording layer faces inwardly.

Materials for use in the substrates may be selected at will from materials hitherto used for formation of substrates for conventional optical data storage media. Examples of the material include: glass; polycarbonate; acrylic resins such as polymethyl methacrylate and the like; vinyl chloride-based resins such as polyvinyl chloride, copolymers of vinyl chloride, and the like; epoxy resins; amorphous polyolefins; polyesters; and combinations thereof. These materials may be used as a film or as a rigid substrate. Among the materials listed above, polycarbonate is preferable from the standpoint of optical properties such as index of double refraction and the like, moisture resistance, dimension stability, and cost. Generally, the substrate has a diameter of 120±3 mm and a thickness of 0.6±0.1 mm or alternatively a diameter of 80±3 mm and a thickness of 0.6±0.1 mm.

As for the coloring method for the substrate, there are several methods, including; a method wherein a prescribed amount of a mass of colored pellets, which is called a master batch and which is prepared in advance by blending a dye or a pigment at a high concentration with pellets and blending these pellets into noncolored pellets; a method wherein a coloring agent, such as a dye, a pigment, or the like, is blended directly into a resin; and a method wherein a coloring layer is provided on a substrate.

Known coloring agents can be used as the coloring agents to be blended directly into materials for the substrates, as the coloring agents for use in the master batches, or as the coloring agents for use in the coloring layers. Examples of the coloring agents include cyanin-based dyes, squalylium-based dyes, azo-based dyes, naphthoquinone-based dyes, anthraquinone-based dyes, porphine-based dyes, tetraazaporphine-based dyes, acridine-based dyes, acridinone-based dyes, oxazine-based dyes, pyromethene-based dyes, spiro-based dyes, ferrocene-based dyes, fluorene-based dyes, fulgide-based dyes, imidazole-based dyes, thiazole-based dyes, pirylene-based dyes, phenazine-based dyes, phenothiazine-based dyes, polyene-based dyes, indole-based dyes, aniline-based dyes, quinophthalone-based dyes, phenoxazine-based dyes, diphenylamine-based dyes, coumarin-based dyes, carbostyryl-based dyes, stilbene-based dyes, and fluorene-based dyes. These coloring agents may be used singly or in a combination of two or more. If a coloring agent is used in the recording layer, the optical absorption peak of the coloring agent to be blended directly into the material for the substrate or to be used in the master batch, is preferably on the shorter wavelength side in relation to the optical absorption peak of the coloring agent to be used in the recording layer. If the optical absorption peak of the coloring agent used in the substrate, is on the shorter wavelength side in relation to the optical absorption peak of the coloring agent to be used in the recording layer, better recording and reproducing characteristics can be obtained because the optical absorption of the substrate exerts no influence on the recording. Further, it is preferable that the coloring agent to be used in the substrate absorbs almost no light of wavelengths of a recording light and a reproducing light. If the coloring agent used in a substrate absorbs the recording light or the reproducing light, the power of a laser cannot be efficiently used, and the amount of light may decrease so that the C/N ratio in recording is reduced. Furthermore, exercise of caution is necessary, because the laser light may be unevenly absorbed at the surface of the recording layer if a certain optical pattern such as a design is provided on the substrate. Accordingly, it is desirable that the substrate surface corresponding to a plane of incidence to light be colored in a hue least inclined to absorb the incident light. Particularly, if a specific pattern is provided, it is desirable that the substrate surface corresponding to a plane of incidence to light is colored in a hue which absorbs substantially no incident light and therefore exerts no influence on recording and reproduction.

According to a first embodiment of the present invention, at least one of difference in color and difference in pattern is present between the two substrates. When providing different colors to the two substrates, the color difference $\Delta E$ between the substrates needs to be 10 or more. The color difference $\Delta E$ is preferably 15 or more, and more preferably 20 or more.

According to a second embodiment of the present invention, in order to prevent warping and plane deflection, it is necessary that the ratio between the optical absorption of the first substrate at the wavelength of maximum absorption in a visible light region and the optical absorption of the second substrate at the wavelength of maximum absorption in the visible light region be set such that the smaller optical absorption is 50% or more of the larger optical absorption. The smaller optical absorption is preferably 60% or more of the larger optical absorption, and more preferably the smaller optical absorption is 80% or more of the larger optical absorption.

In the case where two or more peaks are formed, the highest peaks are compared so that the ratio of the values of optical absorption is within the above-mentioned range.

Further, in the case where two or more peaks are formed and their values of optical absorption are close to each other, it is necessary that the ratio between the average optical absorption of the first substrate at wavelengths ranging from 400 to 700 nm and the average optical absorption of the second substrate at wavelengths ranging from 400 to 700 nm be set such that the smaller average optical absorption is 50% or more of the larger average optical absorption. The smaller average optical absorption is preferably 60% or more of the larger average optical absorption, and more preferably the smaller average optical absorption is 80% or more of the larger average optical absorption.

In the second embodiment, it is preferable to use coloring agents having the same color, and particularly preferable to use the same coloring agent, for the two substrates.

That is, by substantially making the optical absorption properties of the two substrates the same, the thermal effects of light are evened up between the two sides of the optical data storage medium, particularly when an ultraviolet light-curable adhesive is used and light acts to cure the adhesive. As a result, degradation of mechanical properties, such as warping, plane deflection, and the like, can be minimized.

In order to protect the substrate from a solvent for use in the formation of the recording layer, an intermediate protective layer may be provided on the substrate.

Further, on the surface of a side having the recording layer, a primer layer may be provided for such purposes as improvement of surface smoothness, improvement of adhesion, and prevention of the recording layer from being deteriorated. Examples of the material for the primer layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and others; and surface modifying agents such as silane coupling agents. The primer layer can be formed by a process comprising preparing a coating liquid by dissolving or dispersing the above-mentioned material in a suitable solvent, and applying the coating liquid to the substrate surface by a method such as spin coating, dip coating, extrusion coating, or the like. The thickness of the primer layer is generally in the range of from 0.005 to 20 $\mu$m, and preferably in the range of from 0.01 to 10 $\mu$m.

Grooves for tracking or concavities and convexities (pregrooves) indicating such information as address signals are formed on the substrate (or on the primer layer) which is to have a recording layer. Preferably, these pregrooves are formed directly on the substrate at a desired track pitch when a resinous material such as polycarbonate is subjected to injection molding or extrusion molding. Alternatively, the pregrooves may be formed by providing a pregroove layer. A mixture composed of at least one monomer (or oligomer) selected from a monoester, diester, a triester, and a tetraester of acrylic acid and a photopolymerization initiator can be used as a material for the pregroove layer. For example, the pregroove layer can be obtained by a process comprising the steps of applying a mixture composed of the above-mentioned acrylic acid ester and the polymerization initiator on a precisely fabricated stamper to form a layer, placing a substrate on the layer, curing the layer by irradiating the layer with ultraviolet light through the substrate or the stamper so that the layer strongly adheres to the substrate, and separating the substrate from the stamper. The thickness of the pregroove layer is generally in the range of from 0.05 to 100 $\mu$m, and preferably in the range of from 0.1 to 50 $\mu$m.

The depth of the pregroove is preferably in the range of from 80 to 300 $\mu$m, and more preferably in the range of from 100 to 250 $\mu$m. Further, the half-value width of the pregroove is preferably in the range of from 0.2 to 0.7 $\mu$m. Furthermore, in order that the sensitivity can be enhanced with almost no reduction in reflectance, the depth of the pregroove layer is preferably in the range of from 150 to 200 $\mu$m. The sensitivity of the optical disk having the above-mentioned construction is so high that recording can be carried out even with a low laser power. As a result, a cheaper semiconductor laser can be used, or alternatively, the service life of a semiconductor laser can be prolonged.

The recording layer is provided on the surface of the pregrooves on the substrate (or on the surface of the pregrooves on the primer layer). Coloring agents known as those for use in the recording layers of optical data storage media can be used as the coloring agents for the recording layer of the present invention. Examples of the coloring agents include trimethinecyanine-based dyes, pentamethinecyanin-based dyes, heptamethinecyanin-based dyes, squalylium-based dyes, oxonol-based dyes, azo-based dyes, anthraquinone-based dyes, naphthoquinone-based dyes, indophenol-based dyes, phthalocyanine-based dyes, pyrylium-based dyes, thiopyrylium-based dyes, azulenium-base dyes, triphenylmethane-based dyes, xanthene-based dyes, indanthrene-based dyes, indigo-based dyes, thioindigo-based dyes, merocyanine-based dyes, thiazine-based dyes, acridine-based dyes, acridinone-based dyes, oxazine-based dyes, dithiol/metal complex-based dyes, porphine-based dyes, azaporphine-based dyes, pyromethene-based dyes, spiro-based dyes, ferrocene-based dyes, fluorene-based dyes, fulgide-based dyes, imidazole-based dyes, thiazole-based dyes, pirylene-based dyes, phenazine-based dyes, phenothiazine-based dyes, polyene-based dyes, indole-based dyes, aniline-based dyes, quinophthalone-based dyes, phenoxazine-based dyes, diphenylamine-based dyes, coumarin-based dyes, and carbostyryl-based dyes.

When measured in methanol solutions, the wavelengths of maximum absorption in a visible light region of the coloring agents for use in the recording layer are preferably in the range of from 550 to 585 nm, more preferably in the range of from 560 to 585 nm, furthermore preferably in the range of from 565 to 582 nm, and most preferably in the range of from 565 to 575 nm.

Although, in the case of DVD-R described above, the recording layer is a coloring agent-functionalized recording layer containing a dye as a main component, other recording layers such as a phase change-functionalized recording layer, a photomagnetism-functionalized recording layer, and the like can also be used.

The recording layer can be formed by, for example, a process comprising preparing a coating liquid by dissolving a coloring agent and optionally a fading-preventing agent, a binder, and the like in a solvent, applying the coating liquid to the surface having pregrooves thereon, and drying the coating layer.

Examples of the solvent for use in the coating liquid for forming the recording layer include: esters such as butyl acetate and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as cyclohexane; ethers such as tetrahydrofuran, ethyl ether, and dioxane; alcohols such as ethanol, n-propanol, isopropanol, n-butanol, and diacetone alcohol; fluorine-containing solvents such as 2,2,3,3-tetrafluoropropanol; and glycol ethers such as ethylene glycol monomethyl ether, ethylene glycol monoethyl ether, and propylene glycol monomethyl ether. These solvents may be used singly or in a combination of two or more by taking into consideration the solubility of the compounds to be used. Further, according to purposes, the coating liquid may also contain additives such as an antioxidant, a UV absorber, a plasticizer, a lubricating agent, and others.

Typical examples of the fading-preventing agent include a nitroso compound, a metal complex, diammonium salt, an aluminum salt, and others. These examples are described in, for example, Japanese Patent Application Laid-Open (JP-A) Nos. 2-300,288, 3-224,793, and 4-146,189. If a fading-preventing agent is used, the amount to be used is ordinarily in the range of from 0.1 to 50% by weight, preferably in the range of from 0.5 to 45% by weight, more preferably in the range of from 3 to 40% by weight, and particularly preferably in the range of from 5 to 25% by weight, based on the amount of the coloring agent.

Examples of the binder include: naturally occurring organic polymeric substances such as gelatin, cellulose derivatives, dextran, rosin, and rubber; hydrocarbon-based resins such as polyurethane, polyethylene, polypropylene, polystyrene, and polyisobutylene; vinyl-based resins such as polyvinyl chloride, polyvinylidene chloride, and vinyl chloride/vinyl acetate copolymers; acrylic resins such as polymethyl acrylate and polymethyl methacrylate; polyvinyl alcohol; chlorinated polyethylene; epoxy resins; butyral resins; rubber derivatives; and initial-stage condensation products of thermosetting resins such as phenol/formaldehyde resins. If the binder is used in the recording layer, the amount to be used is in the range of from 0.2 to 20 parts by weight, preferably in the range of from 0.5 to 10 parts by weight, and more preferably in the range of from 1 to 5 parts by weight, based on 100 parts by weight of the coloring agent. The concentration of the coloring agent in the coating liquid thus prepared is generally in the range of from 0.01 to 10% by weight, and preferably in the range of from 0.1 to 5% by weight.

Examples of the method for applying the coating liquid to the substrate include spraying, spin coating, dip coating, roll coating, blade coating, doctor roll coating, and screen printing.

A film forming method using a vacuum such as conventional sputtering is used for forming the phase change-functionalized recording layer or the photomagnetism-functionalized recording layer.

The recording layer may be composed of a single layer or plural layers. The layer thickness of the recording layer is generally in the range of from 20 to 500 nm and preferably in the range of from 50 to 300 nm. In the optical data storage medium of the present invention, the layer thickness of the recording layer inside the pregrooves is preferably in the range of from 130 to 200 nm, more preferably in the range of from 140 to 190 nm, and even more preferably in the range of from 145 to 185 nm. The layer thickness of the recording layer on land portions is preferably in the range of from 50 to 150 nm, and more preferably in the range of from 60 to 120 nm.

Particularly with the objective of increasing reflectance when data is reproduced, a reflective layer is provided on the recording layer. A light reflective substance as a material for forming the reflective layer is a substance having a high reflectance with respect to laser light. Examples of the substance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. Among these substances, Cr, Ni, Pt, Cu, Ag, Au, Al, and stainless steel are preferable. Au and Ag are particularly preferable. These substances may be used singly or in a combination of two or more, or alternatively as alloys. The reflective layer can be formed by, for example, vapor-deposition, sputtering, or ion-plating of the above-mentioned reflective substance on the recording layer. The layer thickness of the reflective layer is generally in range of from 10 to 800 nm, preferably in the range of from 20 to 500 nm, and more preferably in the range of from 50 to 300 nm.

For the purpose of enhancing reflectance and recording characteristics, an intermediate layer such as a light-interfering layer can be provided between the recording layer and the reflective layer.

Further for such purposes as physically and chemically protecting the recording layer and the like, a protective layer may be provided on the reflective layer. For such purposes as enhancing scratch resistance and moisture resistance, the protective layer may be provided also on a side of the substrate without the recording layer. Examples of the material for use in the protective layer include an inorganic substance such as $SiO$, $SiO_2$, $MgF_2$, $SnO_2$, and $Si_3N_4$, and an organic substance such as a thermoplastic resin, a thermosetting resin, and a UV-curable resin.

The protective layer can be formed by, for example, laminating a film obtained from extrusion of a plastic on a reflective layer and/or a substrate. Alternatively, the protective layer may be formed by vacuum vapor-deposition, sputtering, coating, or the like. If the protective layer is made from a thermoplastic or thermosetting resin, the protective layer can also be formed by a process comprising preparing a coating liquid by dissolving the resin in a suitable solvent, applying the coating liquid to the reflective layer and/or the substrate, and drying the coating layer. If the protective layer is made from a UV-curable resin, the protective layer can also be formed by a process comprising applying the resin as it is or applying a coating liquid, which is prepared by dissolving the resin in a suitable solvent, to the reflective layer and/or the substrate, and irradiating the coating layer with UV light to cure the layer. According to purposes, the coating liquid may further contain additives such as an antistatic agent, an antioxidant, a UV absorber, and the like. The thickness of the protective layer is generally in the range of from 0.1 to 100 $\mu$m.

The optical data storage medium of the present invention can be prepared by laminating two disks having the above-described structure or by laminating a disk having the above-described structure and a disk having a discoid substrate of the same size in such a manner that the recording layer faces inwardly, by using an adhesive or the like. As an adhesive for this purpose, a photocurable resin such as a UV-curable resin which is used for the formation of the protective layer, a thermosetting resin, a mixture of these resins, a synthetic adhesive, and adhesive double-coated tape can be used. Among these materials, the photocurable resin is preferable. When the photocurable resin is used, one process comprises applying the photocurable resin to at least one of the two disks, joining the two disks face-to-face, flattening the disks uniformly, and irradiating the disks with light. Another process is called a retarded curing process, and this process comprises applying the photocurable resin to at least one of the two disks, irradiating the disk having the resin layer with light, and joining the two disks face-to-face before the curing of the resin is complete. A single-layered photocurable resin layer may perform the dual functions of a protective layer and an adhesive layer.

The total thickness of the optical data storage medium prepared as stated above is preferably in the range of 1.2±0.2 mm.

Information is recorded in the optical data storage medium in, for example, the following way.

First, the optical data storage medium is rotated at a prescribed constant linear velocity (3.4–4.0 m/sec in the case of a DVD format) or at a prescribed constant angular velocity. From the substrate side, the rotating medium is irradiated through a light converging optical system with a recording laser light such as a semiconductor laser. The laser light irradiation causes the irradiated region of the recording layer to absorb the light and to raise the temperature of the region locally. Since the rise in the temperature causes physical and chemical changes of the irradiated region and thus changes the optical properties of the irradiated region, information is recorded accordingly. The recording light to be used is a laser beam within a visible light region or a semiconductor laser beam normally having oscillation wavelengths ranging from 600 to 700 nm (preferably from 620 to 680 nm and more preferably from 630 to 660 nm). The recording light is preferably converged through an optical system whose NA is in the range of from 0.55 to 0.7. The reproduction of the information recorded in the above-described manner can be performed by rotating the optical data storage medium at a prescribed constant linear velocity and irradiating the rotating medium from the substrate side with a semiconductor laser light having the same wavelengths as in the recording process to thereby detect the reflected light. The reproduction of the data recorded in the optical data storage medium of the present invention can be performed at a velocity equal to or higher than the velocity in recording.

EXAMPLES

Examples of the present invention and comparative examples are described below.

Example 1

85.0 parts by weight of polycarbonate (Panlite AD 5503 manufactured by Teijin Kasei Co., Ltd.) and 15.0 parts by weight of a blue master batch (manufactured by Bayer Ltd.) were mixed together. By using this mixture, a discoid substrate (having a diameter of 120 mm and a thickness of 0.6 mm) was prepared. Then, spiral pregrooves (having a track pitch of 0.8 $\mu$m, a groove width of 0.3 $\mu$m, and a pregroove depth of 0.15 $\mu$m) were injection-molded on the substrate. Meanwhile, 1.5 g of a dye indicated below was dissolved in 100 cc of 2,2,3,3-tetrafluoro-1-propanol to thereby prepare a coating liquid to form a recording layer. The coating liquid was applied to the pregroove face of the substrate at a revolving velocity of 300 rpm and the coating layer was dried by varying the velocity within a range of from 300 to 3000 rpm. The thickness of the recording layer inside the pregrooves was about 140 nm, as a result of measurement of the cross-section of the layer by observation using an SEM.

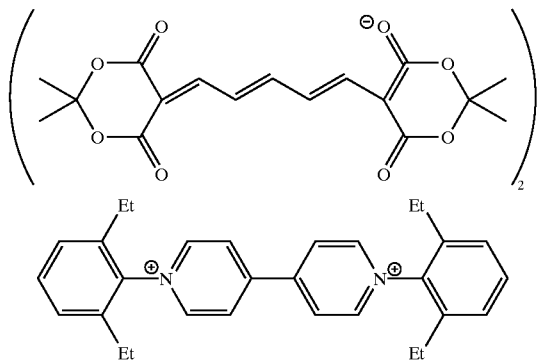

Next, a reflective layer having a thickness of about 100 nm was formed by sputtering Ag on the recording layer. Further, a UV-curable resin (SD 318 manufactured by Dainippon Ink and Chemicals Inc.) was spin-coated on the reflective layer by varying the revolving velocity within a range of from 300 to 4000 rpm. Then, the coating was irradiated with ultraviolet light from a high-pressure mercury lamp to cure the coating. The layer thus formed served as a protective layer having a thickness of about 8 $\mu$m. In this way, a laminated article (disk), which comprised a substrate having thereon the recording layer, the reflective layer, and the protective layer in this order, was obtained.

On the other hand, 87.0 parts by weight of polycarbonate (Panlite AD 5503 manufactured by Teijin Kasei Co., Ltd.) and 13.0 parts by weight of a blue master batch (manufactured by Bayer Ltd.) were mixed together. By using this mixture, a discoid substrate (having a diameter of 120 mm and a thickness of 0.6 mm) was prepared. By using the same conditions as in the above-described procedure, a reflective layer and a protective layer were formed on the substrate. In this way, another disk was prepared. The color difference $\Delta E$ between the two substrates was 15. Then, an adhesive (SK 7000 manufactured by Sony Chemicals Corporation) was screen-printed on the protective layer of each disk so that a film thickness of 20 $\mu$m was obtained. After that, the adhesive layers were irradiated with ultraviolet light and bonded face-to-face. In this way, a DVD-R type optical data storage medium was produced.

Example 2

A DVD-R type optical data storage medium was obtained by repeating the procedure of Example 1, except that the amounts of the polycarbonate and the blue master batch in the formulation for producing the disk without a recording layer were 89.0 parts by weight and 11.0 parts by weight, respectively.

Example 3

A DVD-R type optical data storage medium was obtained by repeating the procedure of Example 1, except that the amount of the polycarbonate was 100 parts by weight and the blue master batch was not used in the formulation for producing the disk without a recording layer.

Comparative Example 1

A DVD-R type optical data storage medium was obtained by repeating the procedure of Example 1, except that the amounts of the polycarbonate and the blue master batch in the formulation for producing the disk without a recording layer were 86.0 parts by weight and 14.0 parts by weight, respectively.

Comparative Example 2

A DVD-R type optical data storage medium was obtained by repeating the procedure of Example 1, except that the amounts of the polycarbonate and the blue master batch in the formulation for producing the disk without a recording layer were 85.2 parts by weight and 14.8 parts by weight, respectively.

Comparative Example 3

A DVD-R type optical data storage medium was obtained by repeating the procedure of Example 1, except that the amount of the polycarbonate was 100 parts by weight and the blue master batch was not used in the formulations for producing the two disks.

The front and the back of each of the optical data storage media obtained above were inspected visually and also by means of a sensor (PIC 140 manufactured by Keyence Corp.). The results of rating distinguishability of the front and the back are shown in Table 1.

TABLE 1

| Inspecting methods | Example 1 With both sides colored | Example 2 With both sides colored | Example 3 With single side colored | Comparative example 1 With both sides colored | Comparative example 2 With both sides colored | Comparative example 3 With both sides noncolored |
|---|---|---|---|---|---|---|
| Color difference ΔE | 15 | 30 | — | 5 | 1 | — |
| Visual inspection | ⊚ | ⊚ | ⊚ | ○ | x | x |
| Inspection with sensor | ⊚ | ⊚ | ⊚ | x | x | x |

In Table 1, symbols denote as follows: ⊚: easily distinguishable; ○:distinguishable if carefully inspected; X: not distinguishable

Example 4

85.0 parts by weight of polycarbonate (Panlite AD 5503 manufactured by Teijin Kasei Co., Ltd.) and 15.0 parts by weight of a blue master batch (manufactured by Bayer Ltd.) were mixed together. By using this mixture, a discoid substrate (having a diameter of 120 mm and a thickness of 0.6 mm) was prepared. Then spiral pregrooves (having a track pitch of 0.8 μm, a groove width of 0.3 μm, and a pregroove depth of 0.15 μm) were injection-molded on the substrate. Meanwhile, 1.5 g of a dye indicated below was dissolved in 100 cc of 2,2,3,3-tetrafluoro-1-propanol to thereby prepare a coating liquid to form a recording layer. The coating liquid was applied to the pregroove face of the substrate at a revolving velocity of 300 rpm and the coating layer was dried by varying the velocity within a range of from 300 to 3000 rpm. The thickness of the recording layer inside the pregrooves was about 140 nm, as a result of measurement of the cross-section of the layer by observation using an SEM.

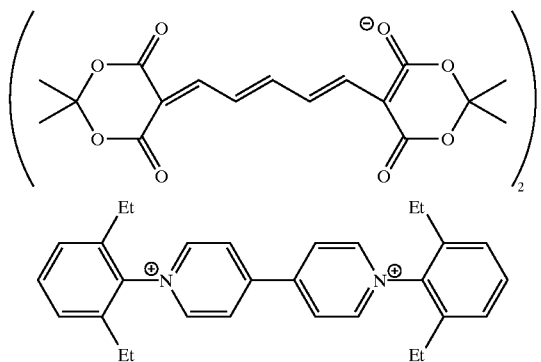

Next, a reflective layer having a thickness of about 160 nm was formed by sputtering Ag on the recording layer. Further, a UV-curable resin (SD 318 manufactured by Dainippon Ink and Chemicals Inc.) was spin-coated on the reflective layer by varying the revolving velocity within a range of from 300 to 4000 rpm. Then, the coating was irradiated with ultraviolet light from a high-pressure mercury lamp to cure the coating. The layer thus formed served as a protective layer having a thickness of about 8 μm. In this way, a laminated article (disk), which comprised the substrate having thereon the recording layer, the reflective layer, and the protective layer in this order, was obtained.

On the other hand, 85.0 parts by weight of polycarbonate (Panlite AD 5503 manufactured by Teij in Kasei Co., Ltd.) and 15.0 parts by weight of a blue master batch (manufactured by Bayer Ltd.) were mixed together. By using this mixture, a discoid substrate (having a diameter of 120 mm and a thickness of 0.6 mm) was prepared. By using the same conditions as in the above-described procedure, a reflective layer and a protective layer were formed on the substrate. In this way, another disk was prepared. The color difference ΔE between the two substrates was 15.

Then, an adhesive (SK 7000 manufactured by Sony Chemicals Corporation) was screen-printed on the protective layer of each disk so that a film thickness of 20 μm was obtained. After that, the adhesive layers were irradiated with ultraviolet light and bonded face-to-face. In this way, a DVD-R type optical data storage medium was produced.

Example 5

A DVD-R type optical data storage medium was obtained by repeating the procedure of Example 4, except that the amounts of the polycarbonate and the blue master batch in the formulation for producing the disk without a recording layer were 92.0 parts by weight and 8.0 parts by weight, respectively.

Example 6

A DVD-R type optical data storage medium was obtained by repeating the procedure of Example 4, except that the amounts of the polycarbonate and the blue master batch in the formulation for producing the disk without a recording layer were 96.0 parts by weight and 4.0 parts by weight, respectively.

Comparative Example 4

A DVD-R type optical data storage medium was obtained by repeating the procedure of Example 4, except that the amount of the polycarbonate was 100 parts by weight and the blue master batch was not used in the formulation for producing the disk without a recording layer.

Optical absorption at the wavelength of maximum absorption in a visible light region, average optical absorption at wavelengths ranging from 400 to 700 nm, and the tilts (disk inclinations) before and after storage (24 hours in a condition of 80° C. and 85% RH) were measured for both sides of the optical data storage media obtained.

The tilt means the inclination in the direction of radius. As illustrated in FIG. 1, light was projected on the optical data storage medium and reflected off the recording layer. The reflected light was received by a detector such as CCD. The angle between an incident light beam and a reflected light beam was measured as tilt and was expressed in angles α(rad).

The results are shown in Table 2.

TABLE 2

|  | Example 4 | Example 5 | Example 6 | Comparative example 4 |
|---|---|---|---|---|
| Optical absorption at the wavelength of maximum absorption in a visible light region | | | | |
| Face A | 0.992 | 0.992 | 0.990 | 0.992 |
| Face B | 0.990 | 0.950 | 0.850 | 0.109 |
| Ratio of lower optical absorption to higher optical absorption | 99.8 | 95.7 | 85.9 | 11.0 |
| Average optical absorption | | | | |
| Face A | 0.975 | 0.975 | 0.900 | 0.975 |
| Face B | 0.968 | 0.900 | 0.750 | 0.109 |
| Ratio of lower average optical absorption to higher average optical absorption (%) | 99.3 | 92.3 | 83.3 | 11.2 |
| Tilt before storage (rad) | 0.4 | 0.45 | 0.45 | 0.6 |
| Tilt after storage (rad) | 0.6 | 0.65 | 0.60 | 1 |

Note: Side A designates the face on the side with a recording layer.

It can be seen from the results of Table 2 that, in comparison with Comparative Example 4, the optical data storage media of Examples 4–6 each have a smaller tilt value and a smaller change in tilt between before and after storage, and thus have stable mechanical properties.

What is claimed is:

1. A single-side type optical data storage medium prepared by laminating face-to-face a disk comprising a first substrate having thereon a recording layer containing a coloring agent and a disk comprising a second substrate, wherein the ratio between the optical absorption of the first substrate at the wavelength of maximum absorption in a visible light region and the optical absorption of the second substrate at the wavelength of maximum absorption in the visible light region is set such that the smaller optical absorption is in a range of 50%–100% of the larger optical absorption.

2. A single-side type optical data storage medium according to claim 1, wherein the optical absorption peak of a coloring agent used in said substrate, is on the shorter wavelength side in relation to that of said coloring agent used in said recording layer.

3. A single-side type optical data storage medium according to claim 1, wherein a coloring agent used in said substrate absorbs no light of wavelengths of a recording light and a reproducing light.

4. A single-side type optical data storage medium according to claim 1, wherein the ratio between the optical absorption of the first substrate at the wavelength of maximum absorption in a visible light region and the optical absorption of the second substrate at the wavelength of maximum absorption in the visible light region is set such that the smaller optical absorption is in a range of 60%–100% of the larger optical absorption.

5. A single-side type optical data storage medium according to claim 1, wherein the ratio between the optical absorption of the first substrate at the wavelength of maximum absorption in a visible light region and the optical absorption of the second substrate at the wavelength of maximum absorption in the visible light region is set such that the smaller optical absorption is in a range of 80%–100% of the larger optical absorption.

6. A single-side type optical data storage medium prepared by laminating face-to-face a disk comprising a first substrate having thereon a recording layer containing a coloring agent and a disk comprising a second substrate, wherein the ratio between the average optical absorption of the first substrate at wavelengths ranging from 400 to 700 nm and the average optical absorption of the second substrate at wavelengths ranging from 400 to 700 nm, is set such that the smaller average optical absorption is in a range of 50%–100% of the larger average optical absorption.

7. A single-side type optical data storage medium according to claim 6, wherein the optical absorption peak of a coloring agent used in said substrate, is on the shorter wavelength side in relation to that of said coloring agent used in said recording layer.

8. A single-side type optical data storage medium according to claim 6, wherein a coloring agent used in said substrate absorbs no light of wavelengths of a recording light and a reproducing light.

9. A single-side type optical data storage medium according to claim 6, wherein the ratio between the average optical absorption of the first substrate at wavelengths ranging from 400 to 700 nm and the average optical absorption of the second substrate at wavelengths ranging from 400 to 700 nm, is set such that the smaller average optical absorption is in a range of 60%–100% of the larger average optical absorption.

10. A single-side type optical data storage medium according to claim 6, wherein the ratio between the average optical absorption of the first substrate at wavelengths ranging from 400 to 700 nm and the average optical absorption of the second substrate at wavelengths ranging from 400 to 700 nm, is set such that the smaller average optical absorption is in a range of 80%–100% of the larger average optical absorption.

11. An optical data storage medium prepared by laminating face-to-face two substrates, at least one of which has a recording layer provided thereon, such that the recording layer faces inwardly, wherein optically recognizable different patterns are provided on the two substrates, wherein said recording layer contains a coloring agent.

12. An optical data storage medium prepared by laminating face-to-face two substrates, at least one of which has a recording layer provided thereon, such that the recording layer faces inwardly, wherein optically recognizable different patterns are provided on the two substrates, wherein said recording layer contains a coloring agent, and wherein the optical absorption peak of a coloring agent used in said substrate is on the shorter wavelength side in relation to that of said coloring agent used in said recording layer.

13. An optical data storage medium prepared by laminating face-to-face two substrates, at least one of which has a recording layer provided thereon, such that the recording layer faces inwardly, wherein optically recognizable different patterns are provided on the two substrates, wherein said recording layer contains a coloring agent, and wherein a coloring agent used in said substrate absorbs no light of wavelengths of a recording light and a reproducing light.

14. An optical data storage medium prepared by laminating face-to-face two substrates, at least one of which has a recording layer provided thereon, such that the recording layer faces inwardly, wherein the color difference between the two substrates is between 10 and $24400^{1/2}$, and wherein said recording layer contains a coloring agent.

15. An optical data storage medium according to claim 14, wherein the optical absorption peak of a coloring agent used in said substrate, is on the shorter wavelength side in relation to that of said coloring agent used in said recording layer.

16. An optical data storage medium according to claim 15, wherein a coloring agent used in said substrate absorbs no light of wavelengths of a recording light and a reproducing light.

* * * * *